United States Patent
Shin et al.

(10) Patent No.: US 10,275,649 B2
(45) Date of Patent: Apr. 30, 2019

(54) APPARATUS OF RECOGNIZING POSITION OF MOBILE ROBOT USING DIRECT TRACKING AND METHOD THEREOF

(71) Applicant: YUJIN ROBOT CO., LTD., Seoul (KR)

(72) Inventors: Kyung Chul Shin, Seoul (KR); Seong Ju Park, Gunpo-si (KR); Jae Young Lee, Gunpo-si (KR)

(*) Notice: Subject to any disclaimer, the term of this patent is extended or adjusted under 35 U.S.C. 154(b) by 47 days.

(21) Appl. No.: 15/382,533

(22) Filed: Dec. 16, 2016

(65) Prior Publication Data
US 2017/0154219 A1 Jun. 1, 2017

Related U.S. Application Data

(63) Continuation of application No. PCT/KR2015/006156, filed on Jun. 17, 2015.

(30) Foreign Application Priority Data

Jun. 17, 2014 (KR) .................. 10-2014-0073708

(51) Int. Cl.
*G05B 19/00* (2006.01)
*G05B 15/00* (2006.01)
(Continued)

(52) U.S. Cl.
CPC ........ *G06K 9/00664* (2013.01); *B25J 9/1697* (2013.01); *B25J 13/08* (2013.01);
(Continued)

(58) Field of Classification Search
CPC .... G01C 21/20; G05D 1/0246; G05D 1/0272; G06K 9/00664; G06K 9/00744;
(Continued)

(56) References Cited

U.S. PATENT DOCUMENTS

| 7,110,602 B2 * | 9/2006 | Krause ................ G06K 9/0063 382/199 |
| 2006/0257048 A1 * | 11/2006 | Lin ..................... G06K 9/00711 382/276 |

(Continued)

FOREIGN PATENT DOCUMENTS

| KR | 10-2003-0095492 A1 | 12/2003 |
| KR | 10-0834577 A1 | 6/2008 |

(Continued)

OTHER PUBLICATIONS

Ethan Eade and Tom Drummond, Edge landmarks in monocular SLAM, Image and Vision Computing, vol. 27, Issue 5, pp. 588-596, Apr. 2, 2009.

(Continued)

*Primary Examiner* — Harry Y Oh
(74) *Attorney, Agent, or Firm* — Jongkook Park

(57) ABSTRACT

Disclosed are an apparatus of recognizing a position of a mobile robot using direct tracking and a method thereof. An apparatus of recognizing a position of a mobile robot includes two wide angle cameras which obtain one pair of stereo images on a region of interest including a vertical direction and a horizontal direction in accordance with movement of a mobile robot; and a position recognizing unit which extracts an edge from the received stereo image to project a seed in a key frame selected based on the extracted edge onto the stereo images, updates a status parameter indicating rotation and movement of a camera using an intensity error in the calculated projected seed as the projection result, and estimates a position of the mobile robot using the update result.

20 Claims, 10 Drawing Sheets

(51) Int. Cl.
| | |
|---|---|
| G06K 9/00 | (2006.01) |
| G06T 7/73 | (2017.01) |
| G06T 7/285 | (2017.01) |
| G06T 7/13 | (2017.01) |
| G06T 7/246 | (2017.01) |
| B25J 9/16 | (2006.01) |
| G01C 21/20 | (2006.01) |
| G05D 1/02 | (2006.01) |
| G06T 5/00 | (2006.01) |
| G06T 7/00 | (2017.01) |
| B25J 13/08 | (2006.01) |
| G06K 9/46 | (2006.01) |
| H04N 13/239 | (2018.01) |
| H04N 13/00 | (2018.01) |

(52) U.S. Cl.
CPC .......... *G01C 21/20* (2013.01); *G05D 1/0246* (2013.01); *G05D 1/0251* (2013.01); *G05D 1/0253* (2013.01); *G05D 1/0272* (2013.01); *G05D 1/0274* (2013.01); *G06K 9/00744* (2013.01); *G06K 9/4604* (2013.01); *G06K 9/4647* (2013.01); *G06T 5/002* (2013.01); *G06T 7/0002* (2013.01); *G06T 7/13* (2017.01); *G06T 7/248* (2017.01); *G06T 7/285* (2017.01); *G06T 7/74* (2017.01); *H04N 13/239* (2018.05); *G06K 9/00201* (2013.01); *G06T 2207/10021* (2013.01); *G06T 2207/20021* (2013.01); *G06T 2207/30244* (2013.01); *G06T 2207/30252* (2013.01); *H04N 2013/0081* (2013.01); *H04N 2013/0085* (2013.01); *Y10S 901/01* (2013.01)

(58) Field of Classification Search
CPC . G06T 2207/10021; G06T 2207/30244; G06T 5/002; G06T 7/0002; G06T 7/13; G06T 7/248; G06T 7/285; G06T 7/74; H04N 13/0239; H04N 13/239; Y10S 901/01
USPC ........................................................ 700/259
See application file for complete search history.

(56) References Cited

U.S. PATENT DOCUMENTS

| | | | |
|---|---|---|---|
| 2008/0205644 A1* | 8/2008 | Lee | H04N 7/1675 380/210 |
| 2015/0206023 A1* | 7/2015 | Kochi | G01B 11/00 382/199 |

FOREIGN PATENT DOCUMENTS

| | | |
|---|---|---|
| KR | 10-2010-0081588 A1 | 7/2010 |
| KR | 10-2010-0119442 A1 | 11/2010 |
| KR | 10-2011-0011424 A1 | 2/2011 |
| KR | 10-2011-0047797 A1 | 5/2011 |
| KR | 10-2011-0097344 A1 | 8/2011 |
| KR | 10-2012-0070291 A1 | 6/2012 |
| KR | 10-2013-004674 A1 | 5/2013 |

OTHER PUBLICATIONS

John Canny, A Computational Approach to Edge Detection, IEEE Transactions on Pattern Analysis and Machine Intelligence, vol. PAMI-8, No. 6 pp. 679-698, Nov. 1986.

S. Benhimane and E. Malis, Homography-based 2D Visual Tracking and Servoing, International Journal of Robotics Research archive vol. 26 Issue 7 pp. 661-676, Jul. 2007.

Michael Calonder, Vincent Lepetit, Christoph Strecha, and Pascal Fua, BRIEF: Binary Robust Independent Elementary Features, vol. 6314 of the series Lecture Notes in Computer Science pp. 778-792, 11th European Conference on Computer Vision, Heraklion, Crete, Greece, Sep. 5-11, 2010.

Christoph Strecha, Vincent Lepetit, Tomasz Trzcinski, Michael Calonder, Mustafa Özuysal and Pascal Fua, BRIEF: Computing a local binary descriptor very fast, vol. 34 Issue No. 07, Jul. 2012.

Wooyeon Jeong and Kyoung Mu Lee, CV-SLAM: a new ceiling vision-based SLAM technique, IEEE International Conference on Intelligent Robots and Systems, Aug. 2-6, 2005.

Georg Klein and David Murray, Parallel Tracking and Mapping for Small AR Workspaces, IEEE and ACM International Symposium on Mixed and Augmented Reality, Nov. 13-16, 2007.

Woo Yeon Jeong and Kyoung Mu Lee, Visual SLAM with Line and Corner Features, Proceedings of the 2006 IEEE/RSJ International Conference on Intelligent Robots and Systems Beijing China pp. 2570-2575, Oct. 9-15, 2006.

* cited by examiner

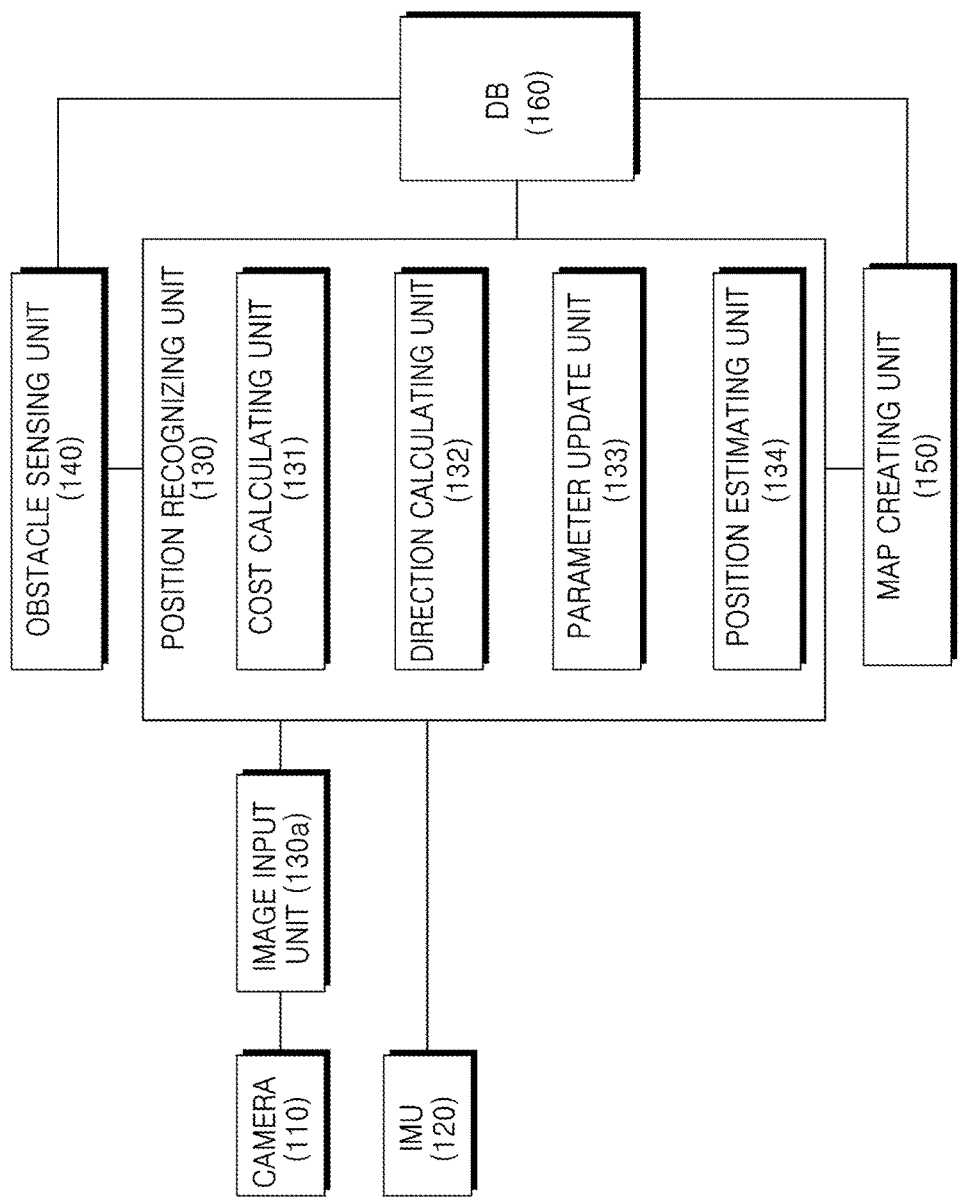
[FIG. 1]

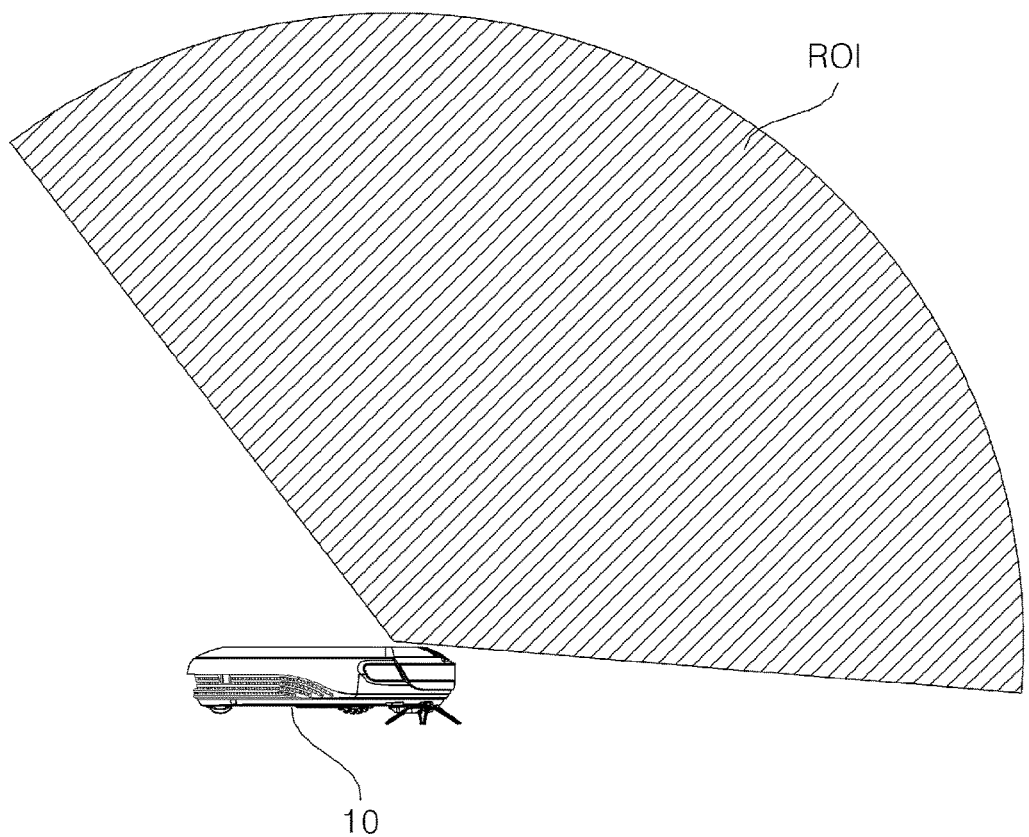
[FIG. 2]

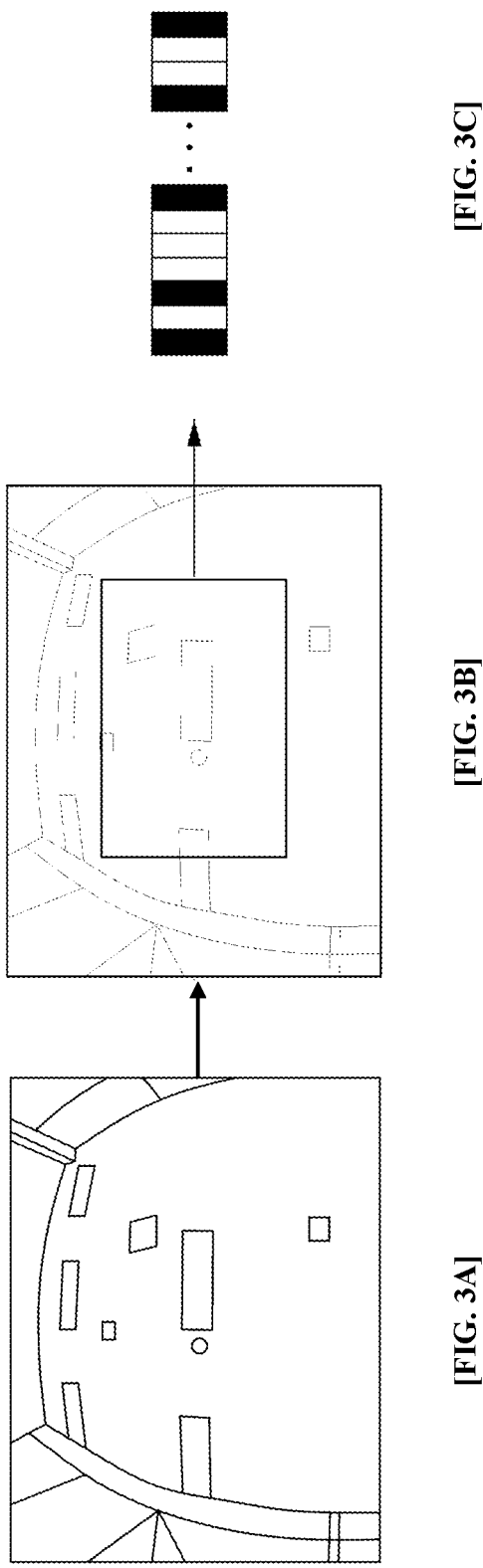

[FIG. 4]
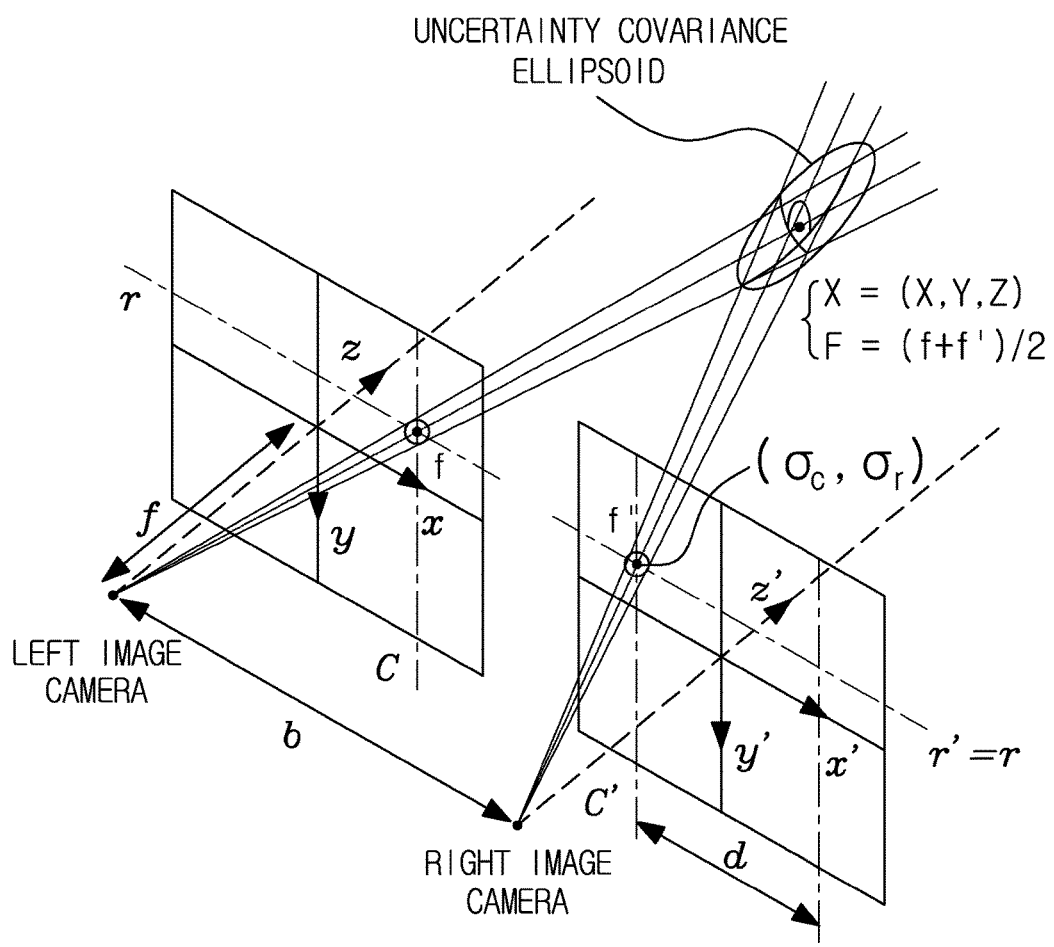

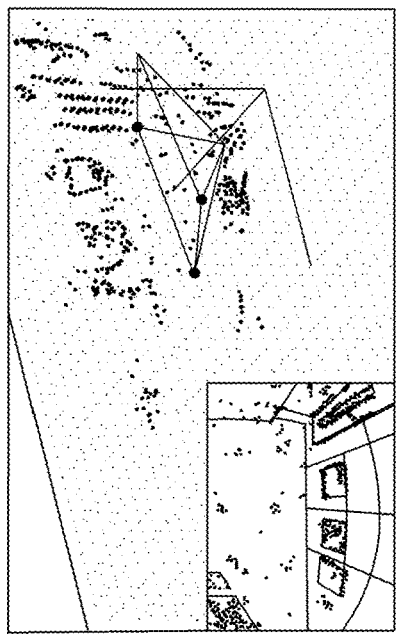
[FIG. 5D]
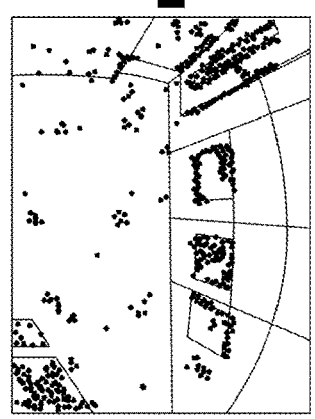
[FIG. 5C]
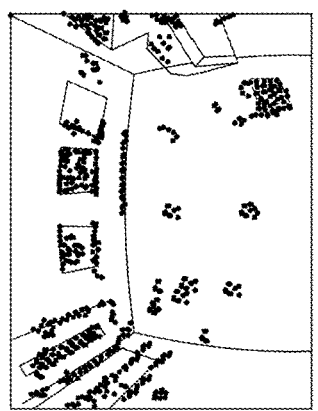
[FIG. 5A]
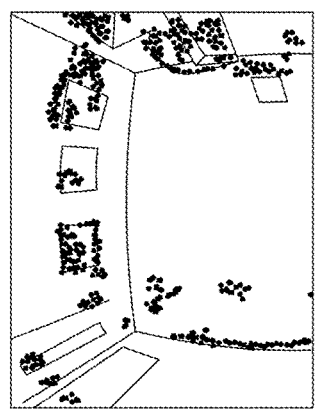
[FIG. 5B]

[FIG. 6]
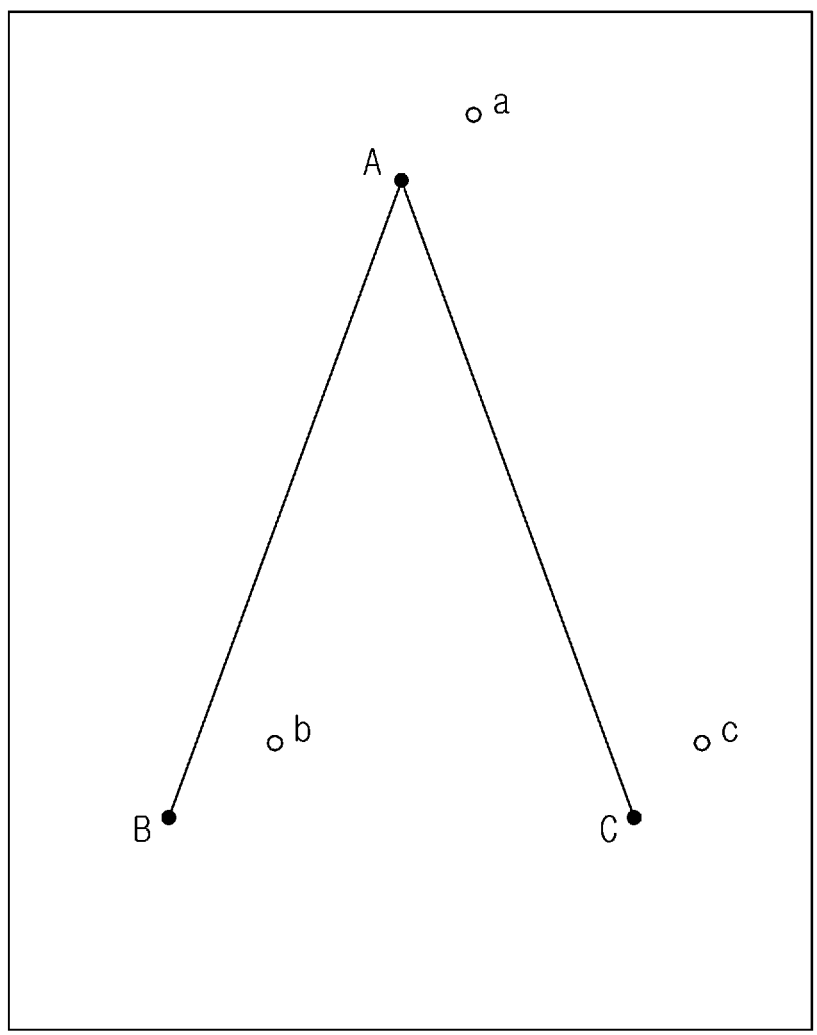

[FIG. 7]
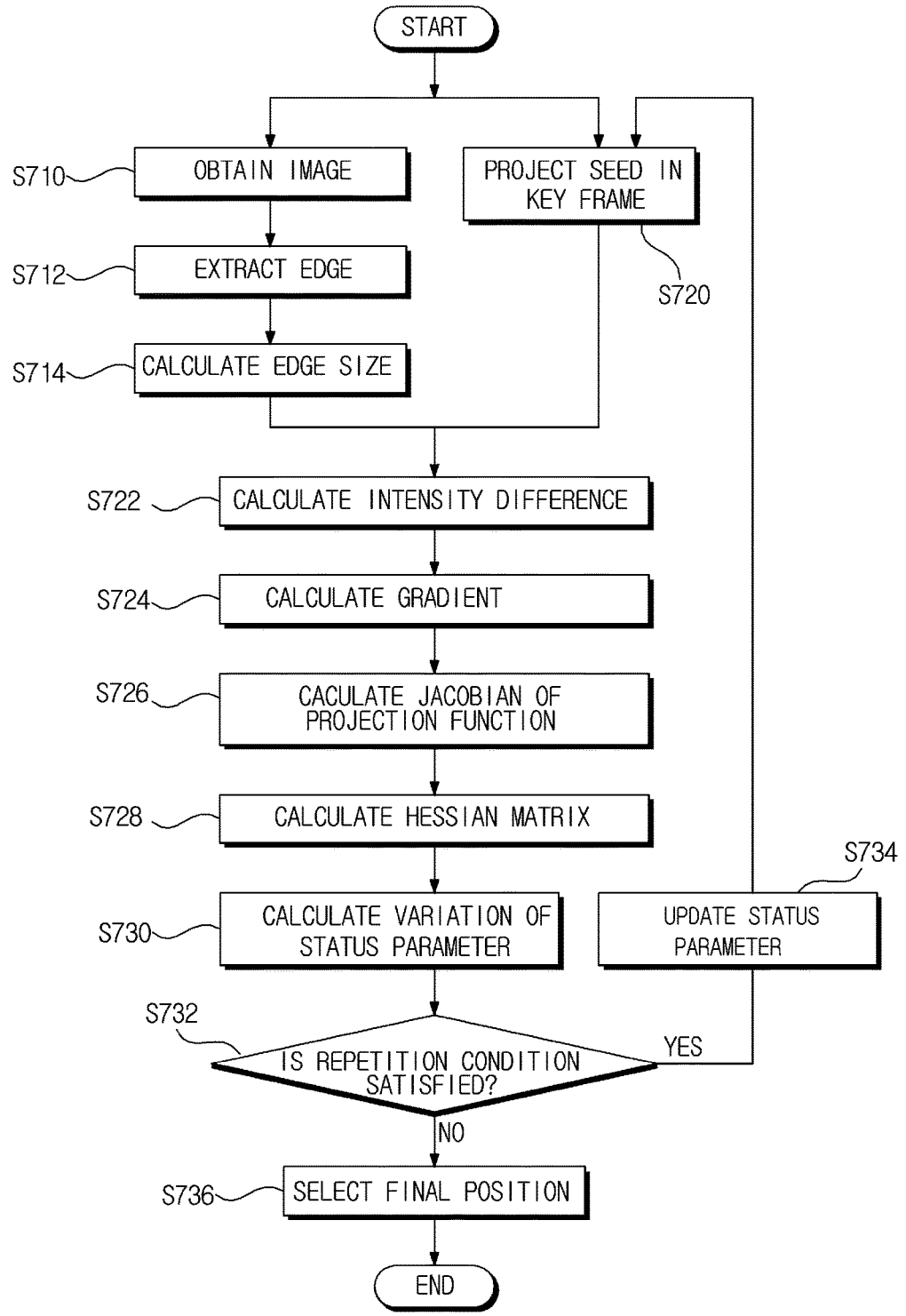

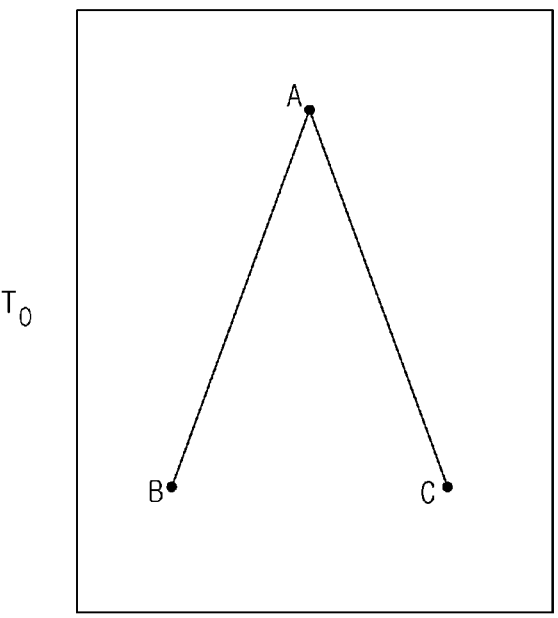
[FIG. 8A]
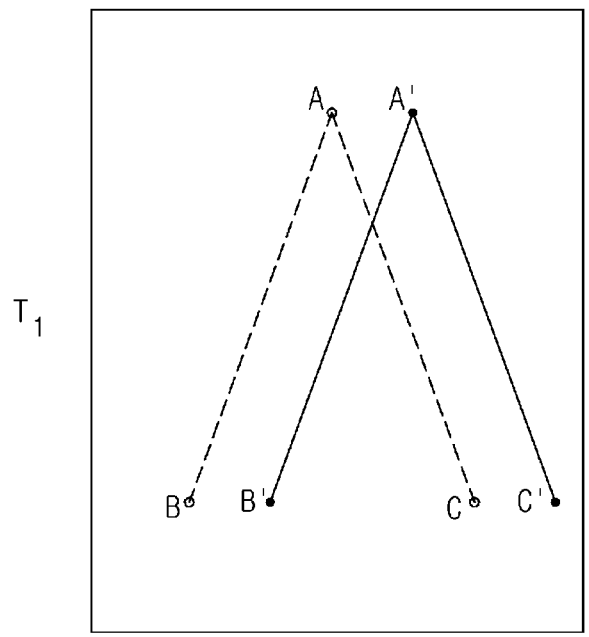
[FIG. 8B]

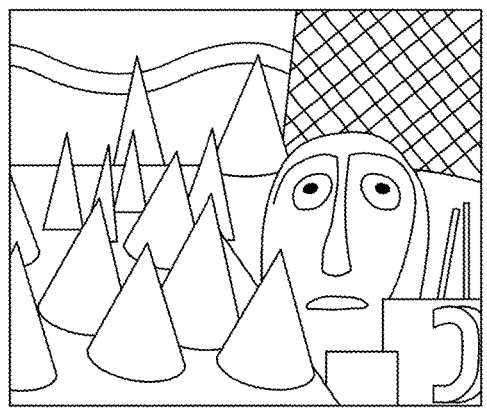
[FIG. 9A]
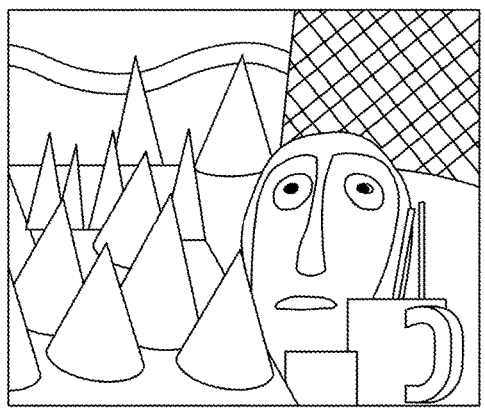
[FIG. 9B]
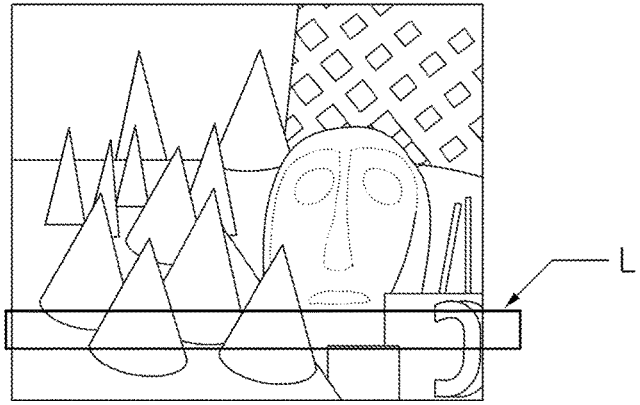
[FIG. 9C]

[FIG. 10]
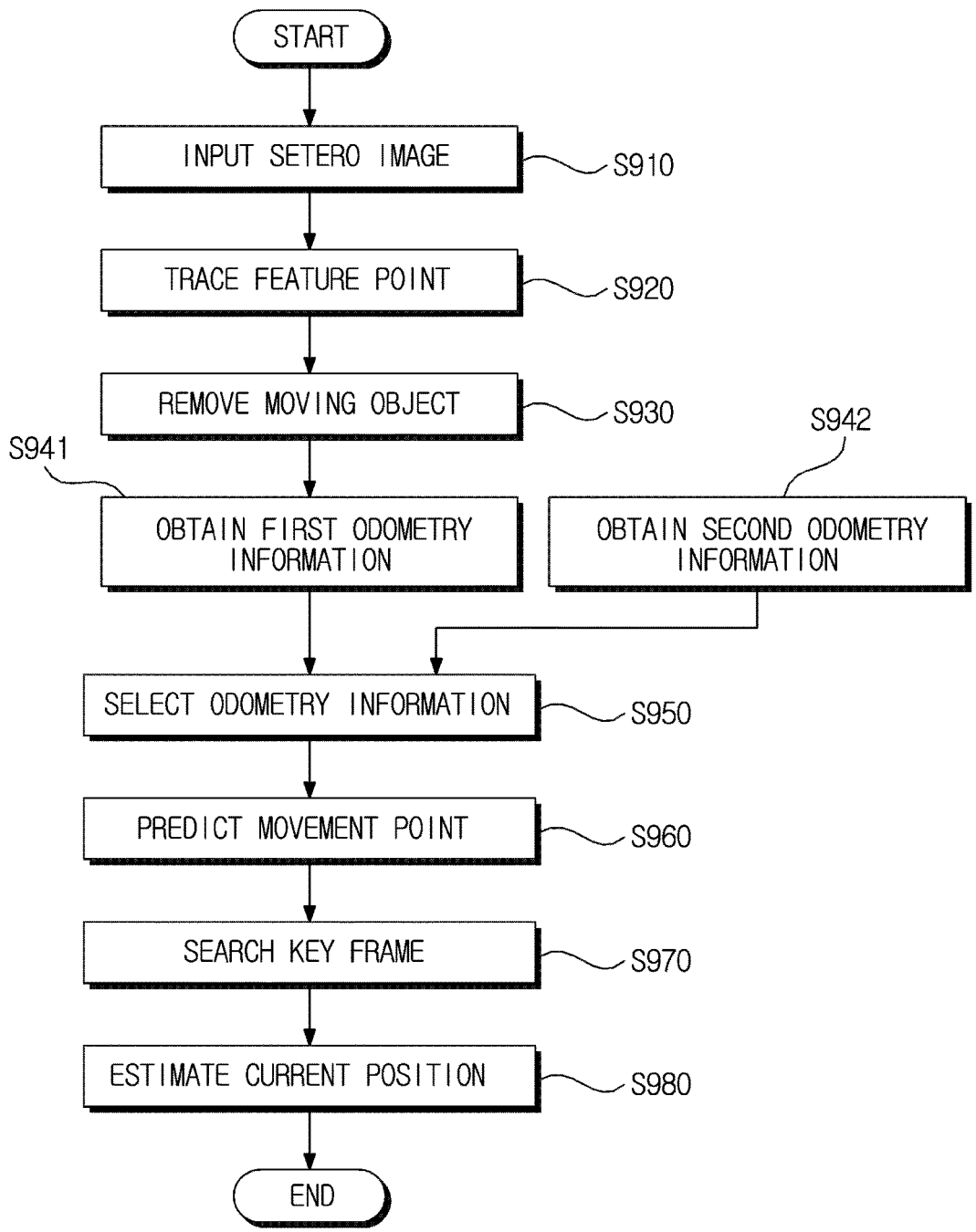

APPARATUS OF RECOGNIZING POSITION OF MOBILE ROBOT USING DIRECT TRACKING AND METHOD THEREOF

CROSS-REFERENCE TO RELATED APPLICATIONS

This application is a continuation of International Application No. PCT/KR2015/006156, filed on Jun. 17, 2015, which claims priority to and the benefit of Korean Patent Application No. 10-2014-0073708 filed in the Korean Intellectual Property Office on Jun. 17, 2014, both of which are hereby incorporated by reference in their entireties.

TECHNICAL FIELD

The present invention relates to a position recognizing method of a mobile robot, and more particularly, to an apparatus of recognizing the position of a mobile robot using direct tracking, and a method thereof.

BACKGROUND

Recently, with the development of robot technology, mobile robots which can set the driving route by themselves and move have been developed. In order to allow such mobile robots to efficiently determine a position and move in a space, the mobile robot must be able to generate a map and recognize its own position in the space wherein it moves.

Mobile robots employ a gyroscope and a driving motor equipped with an encoder to drive by dead reckoning navigation, and generate a map by analyzing images taken using a camera provided in the upper portion. In this case, when an error is incurred in the driving information from the gyroscope and the encoder, image information obtained from the camera is utilized to correct the accumulated error.

However, location-based mobile robots which have been developed so far were developed under the assumption of movement on a two-dimensional plane using a monocular camera or laser scanner. However, when a monocular camera is used, it is difficult to determine the distance to a feature point. Therefore, as the error of the dead reckoning navigation is increased, increasingly many errors may be included in the position recognition results.

Further, since laser scanners are too expensive to apply to mobile robots, increasing numbers of studies have been performed in recent years for utilizing simultaneous localization and mapping (SLAM) technology, which recognizes a space using a stereo camera and updates the location.

Mobile robots based on SLAM technology perform the processes of extracting a corner feature point from an image, creating a map by restoring three-dimensional coordinates of the corner feature point, and recognizing a location.

It is very important for mobile robots to recognize a space and recognize their own position within the space. Since mobiles robot which do not employ the above-described technique have limited mobility and may provide a very limited type of service, mobile robots are being developed competitively.

SUMMARY OF THE INVENTION

The present invention has been made in an effort to provide an apparatus for recognizing the position of a mobile robot using direct tracking, which repeatedly performs the processes of projecting the seeds in a key frame selected based on the predicted movement point onto an image to calculate the intensity difference between the edge in the image and the projected seeds as a result, updating a status parameter indicating the rotation and movement of a camera to reduce the calculated intensity difference, and estimating the position based on the updated status parameter until the intensity difference falls within a threshold value, and a method thereof.

The present invention has also been made in an effort to provide an apparatus for recognizing the position of a mobile robot using direct tracking, which estimates a position based on one type of odometry information selected from between odometry information calculated by visual odometry, based on stereo imaging, and odometry information calculated by internal odometry, based on inertial information, and a method thereof.

Further, the present invention has been made in an effort to provide an apparatus for recognizing the position of a mobile robot using direct tracking, which extracts a preconfigured number of horizontal lines from a stereo image, and performs dense stereo alignment along the extracted horizontal lines to obtain information on the distance to an obstacle, and a method thereof.

However, the object of the present invention is not limited to the above description, and other objects which have not been mentioned above will be more apparent to those skilled in the art from a reading of the following description.

According to an aspect of the present invention, an apparatus of recognizing the position of a mobile robot includes: an image input unit, which receives at least one pair of stereo images obtained using a camera mounted on a mobile robot; and a position recognizing unit, which extracts an edge from the received stereo image to project the seeds from a key frame selected based on the extracted edge onto the stereo images, updates a status parameter indicating the rotation and movement of the camera using the intensity error in the projected seeds calculated from the projection, and estimates the position of the mobile robot using the updated results.

The apparatus may further include two cameras which obtain stereo images.

The position recognizing unit may include: an intensity error calculating unit, which projects seeds from the selected key frame onto the stereo images to calculate the intensity error between the edge in the stereo images and the projected seeds as a result; a parameter updating unit, which updates a status parameter indicating the rotation and movement of the camera to reduce the calculated intensity error; and a position estimating unit, which estimates the position of the mobile robot to be the position where the intensity error is reduced based on the updated status parameter.

Preferably, the parameter update unit may calculate the gradients in the first axis and second axis directions from the coordinates of the projected seeds, calculate a projection function using the status parameter at the present point in time, and update the status parameter using the calculated intensity error, gradient, and projection function in order to reduce the intensity error.

Preferably, the projection function may be a Jacobian of projection function. To update the status parameter for reducing the intensity error using the projection function, a hessian matrix may be calculated using the intensity error, gradient, and projection function, and the status parameter may be updated using the hessian matrix to reduce the intensity error.

Preferably, the position recognizing unit may calculate the variation of the status parameter to be updated using the hessian matrix, check whether the calculated variation of the status parameter satisfies the predetermined repetition conditions for update of the status parameter, and select the status parameter at the present time point as the final position when the repetition conditions are found not to be satisfied.

When the repetition conditions are found to be satisfied as a result of the check, the position recognizing unit may update the status parameter using the calculated variation.

Preferably, the repetition conditions may include whether the variation of the status parameter is equal to or greater than the preconfigured threshold value.

Preferably, the position recognizing unit may predict the state information using odometry information calculated based on the edge and estimate the current position using the predicted state information and a previously stored key frame which is adjacent to the movement point.

Preferably, the position recognizing unit may predict the state information using one type of odometry information from among the first odometry information calculated based on the edge and the second odometry information calculated based on inertial information, and use the predicted state information and a previously stored key frame adjacent to the movement point to estimate the current position.

Preferably, the position recognizing unit may select the first odometry information when the first odometry information satisfies the predetermined conditions, and select the second odometry information when the first odometry information does not satisfy the predetermined conditions.

Preferably, the position recognizing unit may search for at least one adjacent key frame from among a previously stored key frame set based on the predicted status information and estimate the current position of the mobile robot using at least one of the key frames searched.

According to another aspect of the present invention, a method of recognizing the position of a mobile robot may include: receiving at least one pair of stereo images obtained using a camera mounted on a mobile robot; and extracting an edge from the received stereo image, projecting the seed from a key frame selected based on the extracted edge into the stereo images, updating a status parameter indicating the rotation and movement of the camera using the intensity error in the projected seeds calculated from the projection, and estimating the position of the mobile robot using the update results.

Preferably, the estimation sep may include: the step of projecting seeds in the given key frame onto the stereo images to calculate the intensity error between the edge in the stereo images and the projected seeds as a result of the projection; the step of updating a status parameter indicating the rotation and movement of the camera to reduce the calculated intensity error; and the step of estimating the position of the mobile robot to be the position where the intensity error is reduced based on the updated status parameter.

Preferably, in the updating step, a gradient in the first axis direction and the second axis direction may be calculated from the coordinate of a projected seed, a projection function may be calculated using the status parameter at the present point in time, and the status parameter may be updated using the calculated intensity error, gradient, and projection function to reduce the intensity error.

The projection function may be a Jacobian of projection function. To update the status parameter for reducing the intensity error using the projection function, a hessian matrix may be calculated using the intensity error, gradient, and projection function, and the status parameter may be updated using the hessian matrix to reduce the intensity error.

Preferably, in the estimation step, the variation of the status parameter to be updated may be calculated using the hessian matrix, after which a check may be performed to determine whether the calculated variation of the status parameter satisfies the predetermined repetition conditions for update of the status parameter, and the final position may be selected as the status parameter at the present point in time when the repetition condition is found not to be satisfied through the check.

Preferably, in the estimation, when the repetition conditions are found to be satisfied, the status parameter may be updated using the calculated variation.

Preferably, the repetition conditions may include whether the variation of the status parameter is equal to or greater than the predetermined threshold value.

Preferably, in the estimation step, the state information may be predicted using odometry information calculated based on the edge, and the current position may be estimated using the predicted state information and a previously stored key frame which adjacent to the movement point.

Preferably, in the estimation step, the state information may be prediced using one type of odometry information from among the first odometry information calculated based on the edge and the second odometry information calculated based on inertial information, and use the predicted state information and a previously stored key frame adjacent to the movement point to estimate the current position.

Preferably, in the estimation step, the first odometry information may be selected when it satisfies the predetermined conditions, and the second odometry information may be selected when the first odometry information does not satisfy the predetermined conditions.

Preferably, the position recognizing unit may search for at least one adjacent key frame from among a previously stored key frame set based on the predicted status information and estimate the current position of the mobile robot using at least one of the key frames searched.

According to the present invention, the processes of projecting seeds from the key frame selected based on the predicted movement point onto the image to calculate the intensity difference between the edge in the image and the projected seeds as a result of the projection, updating the status parameter indicating the rotation and movement of the camera to reduce the calculated intensity difference, and estimating the position based on the updated status parameter are repeatedly performed until the intensity difference falls within a threshold value, thereby allowing recognition of an accurate position.

Further, according to the present invention, the position is estimated based on one type of odometry information selected from between the odometry information calculated from visual odometry, based on stereo imaging, and the odometry information calculated with internal odometry, based on inertial information, thereby reducing the positional error incurred when the mobile robot is tilted or slides.

Further, according to the present invention, the problem of vulnerability to positional error incurred when the mobile robot is tilted or slides is solved, allowing stable recognition of the position.

Further, according to the present invention, a predetermined number of horizontal lines is extracted from a stereo image and dense stereo alignment is performed along the extracted horizontal lines to obtain information on the distance to an obstacle as a result, thereby allowing distance information to an obstacle to be obtained without a requirement for attaching an expensive dedicated sensor for measuring distance.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is a view illustrating a position recognition apparatus for a mobile robot, according to an exemplary embodiment of the present invention.

FIG. 2 is a view illustrating a region of interest of a wide angle camera according to an exemplary embodiment of the present invention.

FIGS. 3A, 3B and 3C are views illustrating a space recognition process, according to an exemplary embodiment of the present invention.

FIG. 4 is a view illustrating uncertainty of a three-dimensional point, according to an exemplary embodiment of the present invention.

FIGS. 5A, 5B, 5C and 5D are views illustrating three-dimensional information of an edge, according to an exemplary embodiment of the present invention.

FIG. 6 is a view illustrating a position recognition concept, according to an exemplary embodiment of the present invention.

FIG. 7 is a view illustrating a position recognition process, according to an exemplary embodiment of the present invention.

FIGS. 8A and 8B are views illustrating a position recognition principle, according to an exemplary embodiment of the present invention.

FIGS. 9A, 9B and 9C are views illustrating an obstacle sensing process, according to an exemplary embodiment of the present invention.

FIG. 10 is a view illustrating a method of position recognition of a mobile robot, according to an exemplary embodiment of the present invention.

It should be understood that the appended drawings are not necessarily to scale, and present a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an apparatus for recognizing the position of a mobile robot using direct tracking and a method thereof, according to an exemplary embodiment of the present invention, will be described with reference to accompanying drawings. The detailed explanation provided herein will be centered on parts which are required to understand the operation and effects of the present invention.

In the description of components of an exemplary embodiment, a component having the same name may be denoted by a different reference numeral in some drawings, but may also be denoted by the same reference numeral in other different drawings. However, even if this is the case, it does not mean that the component has different functions depending on the exemplary embodiment, or that the components have the same function in the different exemplary embodiments, but rather the function of each of the components shall be determined based on the description of the components in the corresponding exemplary embodiment.

The present invention suggests a new method which repeatedly performs the processes of projecting seeds in a key frame selected based on the predicted state information, calculating the intensity difference between the edge in the image and the projected seeds as a result of the projection, updating a status parameter indicating the rotation and movement of the camera to reduce the calculated intensity difference, and estimating the position based on the updated status parameter until the intensity difference falls within a threshold value.

Further, according to an exemplary embodiment, the position is estimated based on one type of odometry information selected from between the odometry information calculated by visual odometry, based on stereo imaging, and the odometry information calculated by internal odometry, based on inertial information, and a predetermined number of horizontal lines is extracted from a stereo image for performance of dense stereo alignment along the extracted horizontal lines to obtain information on the distance to an obstacle as a result.

FIG. 1 is a view illustrating an apparatus for recognizing the position of a mobile robot, according to an exemplary embodiment of the present invention.

The mobile robot position recognizing apparatus, according to an exemplary embodiment of the present invention, may include an image input unit 130a and a position recognizing unit 130. The mobile robot position recognizing apparatus, according to the exemplary embodiment of the present invention, may include at least one of a camera 110, an inertial measurement unit (IMU) 120, a position recognizing unit 130, an obstacle sensing unit 140, a map creating unit 150, and a database (DB) 160, if necessary.

The image input unit 130a receives at least a pair of stereo images obtained from the mobile robot. The stereo image may be images obtained using two cameras mounted on the mobile robot.

Two cameras 110 may be provided to obtain a pair of stereo images, that is, a left image and a right image. Here, two cameras indicates that two different lenses are used to obtain an image from two different viewpoints. Further, the case in which two lenses are provided in one image obtaining device to obtain two images is also included in the scope of the meaning. In this case, the camera 110 may be mounted to have a predetermined area of interest. Here, the region of interest may be a region to be photographed using the camera 110 mounted on the mobile robot.

The camera 110 may preferably be a wide angle camera. A wide angle camera is a camera which acquires images using a wide angle lens having an angle of view which is wider than that of a general camera lens. It is desirable to use a wide angle camera for the mobile robot to obtain a broader image of the surroundings. For example, the wide angle camera may be a camera using a fish eye lens. Here, in the wide angle camera, the angle of view of the wide angle lens may be 60 to 270 degrees, for example. In the wide angle camera, according to the exemplary embodiment of the present invention, the angle of view is not limited to the range of the above-described angle of view, and cameras employing lenses of various ranges of the angle of view may also be utilized.

FIG. 2 is a view illustrating a region of interest of a wide angle camera, according to an exemplary embodiment of the present invention.

As illustrated in FIG. 2, according to the exemplary embodiment of the present invention, unlike existing mobile robots in which the camera is directed either toward the ceiling or the front side, the two cameras 110 mounted on the mobile robot 10 in the present invention employ wide angle lenses which can see both the ceiling and the front side, so that both the ceiling and the front side may be set as regions of interest (ROI).

For example, the camera may take images of regions in both a horizontal direction and a vertical direction using the wide angle lens.

According to the exemplary embodiment of the present invention, both the ceiling and the front side are set as regions of interest using the camera 110 mounted as described above, so that the feature points may be easily secured. Further, the position may now be recognized even in locations where it is difficult to find feature points, and obstacles located at the front side may also be recognized.

The IMU 120 measures inertial information of the mobile robot, for example, information such as the position, pose, and the like.

The position recognizing unit 130 extracts edges from the received stereo images. In this exemplary embodiment of the present invention, as described above, the edge may be extracted using approximated difference of Gaussian (ADoG) or a gradient.

First, a method of extracting an edge using a gradient will be described.

The position recognizing unit 130 obtains gradients in a first axis and a second axis direction from each pixel of the received stereo image input and extracts the edge based on the gradients in the first axis and second axis directions.

The first axis and the second axis may be different axes which are orthogonal to each other in the coordinate system of a stereo image plane. Preferably, the first axis and the second axis may be the x-axis and y-axis of an orthogonal coordinate system formed by the x-axis and the y-axis. Hereinafter, the operation of the position recognizing unit 130 utilizing the x- and y-axis as the first and second axes, respectively, will be described. Hereinafter, the operation of the position recognizing unit 130 which has been described with reference to the x-axis and the y-axis may also be applied to the first axis and the second axis in the same way.

Next, the position recognizing unit 130 calculates the magnitude, $I_m$, of the gradient using gradients $I_x$ and $I_y$ in the x-axis and y-axis direction, respectively. The magnitude $I_m$ may be calculated using the following equation: $I_m = (I_x^2 + I_y^2)^{1/2}$.

Next, the position recognizing unit 130 calculates the angle of the gradient, $I_\theta$, using gradients $I_x$ and $I_y$ in the x-axis and y-axis direction, respectively. The angle $I_\theta$ may be calculated with the following equation: of $I_\theta = \text{atan } 2 (I_x, I_y)$. Here, atan 2(y,x) is an arctangent calculating function having two input variables and, for example, may be calculated using the following equation:

$$\text{atan2}(y, x) = \begin{cases} \arctan\frac{y}{x} & x > 0 \\ \arctan\frac{y}{x} + \pi & y \geq 0, x < 0 \\ \arctan\frac{y}{x} - \pi & y < 0, x < 0 \\ +\frac{\pi}{2} & y > 0, x = 0 \\ -\frac{\pi}{2} & y < 0, x = 0 \\ \text{underfined} & y = 0, x = 0 \end{cases}$$

Next, the position recognizing unit 130 finally extracts the image of an edge through a non-maximal suppression (NMS) process based on the calculated magnitude of the gradient, $I_m$, and the angle of the gradient, $I_\theta$, of each pixel.

That is, the position recognizing unit 130 selects the pixel having the largest gradient magnitude $I_m$ among adjacent pixels having the same angle with respect to the angle of the gradient $I_\theta$ of the pixel as the maximal value (maxima).

This process is applied to all pixels to extract an edge formed by one line.

Thereafter, the position recognizing unit 130 extends the region to a preconfigured number of pixels adjacent to the pixel located on the line which forms the edge, and selects the pixel in the extended region which has a size equal to or greater than a predetermined threshold value as an edge.

For example, the position recognizing unit 130 extends the region to two pixels which neighbor the pixel most closely, and selects all pixels from among the pixels in the extended region which have a size that is equal to or greater than the predetermined threshold value as an edge.

This process is applied to all pixels to extract a final edge image, which is formed by a plurality of lines extended from the edge formed by one line through NMS.

Here, the NMS (non-maximal suppression) process may use, for example, the non-maximal suppression technique introduced in "Canny, J., A Computational Approach To Edge Detection, IEEE Trans. Pattern Analysis and Machine Intelligence, 8(6):679 to 698, 1986." or may also use various other types of non-maximal suppression techniques.

Next, a method of extracting an edge using an approximated difference of Gaussian (ADoG) will be described.

The present invention suggests a new method in which an integral image is obtained from an original image, after which a box smoothing process is performed on the integral image to obtain a box smoothed image as a result. The original image is then subtracted from the box smoothed image to finally extract an edge image. In the present invention, the method of extracting an edge through the box smoothing process is referred to as an approximated difference of Gaussian (ADoG).

Here, the position recognizing unit 130 performs a smoothing processing on the received stereo image to obtain a smoothed image. The position recognizing unit 130 then compares the smoothed image with the original stereo image to extract an edge, and estimate the current position of the mobile robot based on the extracted edge.

Here, the position recognizing unit 130 obtains an integral image from the stereo image, performs a box smoothing process on the obtained integral image to calculate a box smoothed image, and compares the calculated box smoothed image with the original stereo image so that the edge may be extracted as a result of the comparison.

To this end, the position recognizing unit 130 may include an integral image obtaining unit, which obtains an integral image from the stereo image; a box smoothing image calculating unit, which performs a box smoothing process on the obtained integral image to calculate a box smoothed image; and an edge extracting unit, which compares the calculated box smoothed image with the original stereo image to extract the edge as a result of the comparison. The position recognizing unit may further include a position estimating unit. Here, the position estimating unit may perform the operation of estimating the position of the mobile robot using the edge extracted by the position recognizing unit 130, which will be described in detail below.

The integral image obtaining unit of the position recognizing unit 130, according to the exemplary embodiment of the present invention, may obtain an integral image "IntegImage" from the stereo image "orgImage" through the following equation:

$$IntegImage(x, y) = \sum_{y'=0}^{y} \sum_{x'=0}^{x} orgImage(x', y')$$

Here, (x, y) indicates a coordinate of the integral image and (x',y') indicates a coordinate of the stereo image.

Next, the smoothing image calculating unit of the position recognizing unit 130 performs a box blurring process or a box smoothing process on the obtained integral image to calculate a box smoothed image as a result of the box smoothing process.

In this case, the box smoothing may be considered as a preprocessing process for removing the noise or extracting contour information, similarly to Gaussian smoothing.

In the present invention, box smoothing processing has been described as an example, but the present invention is not limited thereto, and various other smoothing processing techniques, such as Gaussian smoothing, may also be applied.

Next, the edge extracting unit of the position recognizing unit 130 extracts an edge image "$I_{edge}$" by subtracting the original image, that is, the stereo image "$I_{source}$," from the box smoothed image "$I_{box\_blur}$," which may be calculated with the following equation: $I_{edge} = I_{box\_blur} - I_{source}$.

The final edge image may be extracted through these processes of integration, smoothing, and subtraction.

The position recognizing unit 130 receives stereo image input from the camera 110 and recognizes a given space based on the received stereo image whenever the mobile robot moves a predetermined distance.

FIG. 3 is a view illustrating the space recognition process, according to an exemplary embodiment of the present invention.

As illustrated in FIG. 3, the position recognizing unit 130 recognizes the given space whenever the mobile robot moves a predetermined distance, or whenever a new key frame is generated, and creates a database thereof.

The position recognizing unit 130 may reduce the received stereo image to be of a preconfigured size for blurring. Here, it is desirable that the preconfigured size may be one eighth the size of the received stereo image. Referring to FIG. 3, the position recognizing unit 130 reduces the received stereo image (a) and generates a blurred image (b).

The position recognizing unit 130 encodes the blurred stereo image using a binary robust independent elementary features (BRIEF) binary descriptor to generate binary data as a result of the encoding. Here, the BRIEF binary descriptor may be encoded using the method introduced in {BRIEF}: Computing a Local Binary Descriptor Very Fast, M. Calonder, V. Lepetit, M. Ozuysal, T. Trzcinski, C. Strecha, and P. Fua IEEE Transactions on Pattern Analysis and Machine Intelligence 2012. Here, the binary data may be generated to be 32 bytes, for example. FIG. 3C is a reference view illustrating the BRIEF binary descriptor.

The position recognizing unit 130 compares the binary data generated as described above with the data indicating the absolute position of the mobile robot in the previously stored key frame, and as a result of the comparison, may recognize the current position using the absolute position when the absolute position falls within a preconfigured range.

The reason why the BRIEF binary descriptor is used to recognize a space in the exemplary embodiment of the present invention is because the calculation speed is much faster than that of established descriptors which are used in the related art, such as SIFT or SURF.

The position recognizing unit 130 receives stereo image input from the wide angle camera 110 to obtain first type of odometry information through visual odometry based on the input stereo image, and receives inertial information from the IMU 120 to obtain the second odometry information through internal odometry based on the input inertial information. The odometry information to be obtained by the present invention includes a movement distance and a movement angle. Here, the movement angle refers to an angle with respect to a predetermined direction.

In this case, the position recognizing unit 130 extracts a feature point from the stereo image and traces the extracted feature point to obtain odometry information using the traced feature point. The position recognizing unit 131 uses one of the pair of obtained stereo images, generally using the left stereo image.

Generally, the feature point which is extracted during the preprocessing process is a corner. However, it is impossible to obtain a sufficient amount of feature points in regions where there is no texture, such as in a hallway or a large office space.

In order to solve the above-mentioned problem, the position recognizing unit 130 performs stereo matching on the edges. That is, the position recognizing unit 130 extracts an edge from the stereo image and performs sparse stereo matching on the extracted edge. Here, sparse stereo matching is a concept which is distinguished from dense stereo matching. Sparse stereo matching is a matching method which focuses more on the rough and quick matching of stereo images, rather than on calculating an exact matching result. Therefore, various established methods of the related art for adjusting the matching interval or adjusting the search range for the matching may be used.

FIG. 4 is a view illustrating the uncertainty of a three-dimensional point, according to an exemplary embodiment of the present invention.

As illustrated in FIG. 4, the position recognizing unit 130 sets the uncertainty σ according to the depth value obtained as a result of stereo matching and stores the uncertainty σ in the DB. In the case of wide angle cameras, since the resolution is low due to the short focal length, the reliability of the obtained depth value is also low. Therefore, an update is performed later.

The uncertainty of the three-dimensional point obtained using two wide angle cameras is represented by Equation 1.

[Equation 1]

$$\sum = \begin{pmatrix} \sigma_X^2 & \sigma_{XY} & \sigma_{XZ} \\ \sigma_{XY} & \sigma_Y^2 & \sigma_{YZ} \\ \sigma_{XY} & \sigma_{YZ} & \sigma_Z^2 \end{pmatrix} =$$

$$\begin{pmatrix} \frac{b^2\sigma_c^2}{d^2} + \frac{b^2(c-c_0)\sigma_d^2}{d^4} & \frac{(c-c_0)b^2\sigma_d^2(r-r_0)}{d^4} & \frac{(c-c_0)b^2\sigma_d^2 f}{d^4} \\ \frac{(c-c_0)b^2\sigma_d^2(r-r_0)}{d^4} & \frac{b^2\sigma_r^2}{d^2} + \frac{b^2(r-r_0)\sigma_d^2}{d^4} & \frac{(r-r_0)b^2\sigma_d^2 f}{d^4} \\ \frac{(c-c_0)b^2\sigma_d^2 f}{d^4} & \frac{(r-r_0)b^2\sigma_d^2 f}{d^4} & \frac{f^2 b^2 \sigma_d^2}{d^4} \end{pmatrix}$$

Here, $$\begin{pmatrix} \sigma_X^2 & \sigma_{XY} & \sigma_{XZ} \\ \sigma_{XY} & \sigma_Y^2 & \sigma_{YZ} \\ \sigma_{XY} & \sigma_{YZ} & \sigma_Z^2 \end{pmatrix}$$

indicates an uncertainty covariance ellipsoid, b indicates the distance between the cameras, x, y, and z indicate the coordinate system of the left imaging camera, x', y', and z' indicate the coordinate system of the right imaging camera, (c, r) and (c', r') indicate the coordinates of matching pixels in the left camera and the right camera, f and f' indicate the focal distances of the left camera and the right camera, $\sigma_r$ and $\sigma_c$ represent the uncertainty when the feature point is extracted, as axes of the coordinate system, and $r_0$ and $c_0$ represent the optical axis of the camera by a camera coordinate system. Further, d is the difference generated when the feature point is projected to the left side and the right side, and is generally referred to as disparity. $\sigma_d$ represents the uncertainty of the measured depth value.

At a time when it is determined that the mobile robot has moved a predetermined distance, pixels which are stored in the key frame are projected onto the current image to find the most similar pixel, with which the depth value is updated. The update may be performed by applying a general Bayesian rule.

In this case, while the mobile robot is in motion, erroneous information is input due to various variables, specifically, moving obstacles or blocking, thus there may exist outliers in the depth values obtained based on erroneous information.

In order to solve the above-mentioned problem, when the obtained depth value is within 1Σ, the variable "no_success" is increased by one, and when the obtained depth value is larger than 1Σ, the variable "no_failure" is increased by one. Thereafter, only when the reliability no_success/(no_success+no_failure) is larger than a specific value is the depth value used to recognize the position.

The Bayesian rule which is used to update the depth value is represented by Equation 2.

$$\mu = [\sigma_{z_2}^2/(\sigma_{z_1}^2 + \sigma_{z_2}^2)]\mu_{z_1} + [\sigma_{z_1}^2/(\sigma_{z_1}^2 + \sigma_{z_2}^2)]\mu_{z_2}\ 1/\sigma^2 = (1/\sigma_{z_1}^2) + (1/\sigma_{z_2}^2)$$

[Equation 2]

$\mu$ is the average depth value, $\mu_{z_1}$ is the average of the previously obtained depth values, $\mu_{z_2}$ is the average of the currently measured depth values, $\sigma$ is the uncertainty of $\mu$, $\sigma_{z_1}$ is the uncertainty of $\mu_{z_1}$, and $\sigma_{z_2}$ is the uncertainty of $\mu_{z_2}$. Here, although the updating process of the depth value z has been described, the x- and y-values vary depending on z. Therefore, x, y, and z are all updated so that the position may be determined, and the updated x, y, and z are used for inverse determination of the position of the camera.

FIG. 5 is a view illustrating the three-dimensional information of an edge, according to an exemplary embodiment of the present invention. FIG. 5A is an image representing a depth value which is projected to the left imaging camera, FIG. 5B is an image representing a depth value which is projected to the right imaging camera, FIG. 5C is an image representing a depth value obtained through the updating process, and FIG. 5D is an image representing projection to a matching point and a depth value.

As illustrated in FIG. 5, it is understood that when the depth value is repeatedly updated, the three-dimensional information on the edge may be consistently obtained.

The information from the IMU is very important in situations where it is difficult to recognize the environment using a camera. However, in low-priced IMUs, the bias varies significantly, or is difficult to estimate. In order to solve said problem, the bias is obtained by stopping the robot for a moment and taking an average. This case, however, has disadvantages in that the user may think that the mobile robot is unintelligent, and the working speed is also lowered.

In order to solve the above-mentioned problems, the position recognizing unit 130 updates the bias even during movement.

It is assumed that $\theta_g$ is the angular velocity obtained by a gyro sensor and $\theta_c$ is the angular velocity obtained by a wide angle stereo vision. Error may be incurred between these angular velocities due to the bias while the mobile robot is in motion. The error, $\theta_e$, may be defined by Equation 3.

$$\theta_e = \theta_g - \theta_c$$ [Equation 3]

In this case, $\theta_e$ may be a bias. When speedy rotation or disturbance occurs, the bias is updated by applying the Bayesian rule, as represented by Equation 4.

If, $|\theta| < \text{threshold}_{moving}$, $\mu_n = \theta_e$, $\sigma^2 = 1$ deg/sec×0.1 deg/sec [Equation 4]

$\mu_n$ indicates the error of the bias, and $\sigma$ indicates the uncertainty of $\mu_n$. When the mobile robot may stop during movement, the bias is updated as represented by Equation 5.

If, $|\theta| < \text{threshold}_{stop}$, $\mu_n = \theta_e$, $\sigma^2 = 0.1$ deg/sec×0.1 deg/sec [Equation 5]

Since the bias is corrected in real time by the above-described update process, the odometry information obtained through the IMU may maintain a predetermined level of accuracy using the optimal bias, even when the camera cannot be used momentarily.

The position recognizing unit 130 selects either the first type of odometry information or the second type of odometry information and uses the selected information as a basis for estimating the current state information of the mobile robot, for example, the pose or position. That is, the position recognizing unit 130 accumulates the odometry information which is periodically measured during movement, specifically, the movement distance and the movement angle, to predict the relative position and angle from the movement point calculated from the accumulation results, using the point at which movement starts.

Here, the position recognizing unit 130 performs uses the edge extracted from a stereo image to perform stereo matching between the stereo images, and then calculates the disparity value or depth values of the pixels included in the stereo image in order to estimate the current position of the mobile robot using the calculated disparity or depth value. That is, the stereo matching between stereo images is performed on the pixels corresponding to the edge extracted from the stereo image in order to calculate the disparity or depth value, and the current position of the mobile robot is then estimated using the disparity or depth value, along with the optical axis information of the camera, the focal distance information, and information on the distance between the stereo cameras. That is, when the disparity or the depth value of a specific pixel in the stereo image and the specification information (optical axis, focal distance, and distance between cameras) of the camera which obtained said stereo image are known, the three-dimensional coordinates of the pixel may be restored, and the position of the mobile robot may be determined relatively through the three-dimensional coordinates of the pixels included in the stereo image.

For example, when the optical axes u 0 and v 0 are known, the focal distance f, the distance b between cameras are known, and the disparity d is found through stereo matching, the restored three-dimensional coordinates (x,y,z) are $$\left( \frac{b(u-u0)}{d}, \frac{b(v-v0)}{d}, \frac{fb}{d} \right)$$

u and v indicate the coordinates of a pixel in the stereo image.

Further, as the method of determining the position of the object from which the stereo image was obtained using the depth value of the stereo image, various existing techniques of the related art may be employed.

Here, a seed may be set for a pixel selected from the edge of the image. Further, the seed may be set for pixels for which the three-dimensional coordinates have been restored as described above. Here, the seed may include at least one of an image coordinate, a disparity or depth, a variance of disparity or a variance of depth, a pixel value, and a gradient direction and magnitude.

The position recognizing unit 130 may predict the current position using at least one adjacent key frame from among the previously stored key frame set based on the predicted status information. That is, the position recognizing unit 130 may estimate the current position using at least one key frame which is adjacent to the predicted movement point, contained in the status information.

Here, the key frame may be a set of seeds indicating pixels selected from the edge of the stereo image, which contain periodically measured information regarding the status of the mobile robot, and the relationship between the key frame, K, and the seed, s, is represented by Equation 6.

$$K=\{s_0, s_1, \ldots, s_n\} \qquad \text{[Equation 6]}$$

In this case, the position recognition of the mobile robot may be predicted using a registered key frame, and may be considered as the process of calculating how much the mobile robot has moved with respect to the given key frame.

That is, when the rotation and the movement of one camera with respect to the key frame are defined by the parameters R and T, respectively, the projection to the current camera of a coordinate Pi, restored through the seed, is represented by Equation 7.

$$p=prj(R, T, P_i) \qquad \text{[Equation 7]}$$

Here, p indicates the projection coordinates of the seed to the camera.

The projection coordinates of the seed calculated by Equation 7 are gathered to an edge in the image, which is enabled by having appropriate R and T values. That is, the more accurate the position recognition results, the more closely the projection of the coordinates restored through all seeds to the current camera will be gathered onto the edge.

The position recognizing unit 130 extracts an edge from the received stereo image to project the seeds from a key frame selected based on the extracted edge onto the stereo images, updates a status parameter indicating the rotation and movement of the camera using the intensity error between the projected seeds and the edge in the stereo images, and estimates the position of the mobile robot using the update results.

To this end, the position recognizing unit 130, as illustrated in FIG. 1, includes an intensity error calculating unit 131 which projects the seeds from the given key frame onto the stereo images to calculate the intensity error generated between the edge in the stereo image and the pixels corresponding to the coordinates of the projected seeds as a result, a parameter update unit 132 which updates a status parameter indicating the rotation and movement of the camera to reduce the calculated intensity error, and a position estimating unit which estimates the position of the mobile robot to be the position in which the intensity error is reduced, based on the updated status parameter. The intensity error calculating unit 132, the status parameter update unit 132, and the position estimating unit 133 may perform the operations of the position recognizing unit 130, which will be described in detail below.

Here, the parameter update unit 132 calculates gradients from the coordinates of the projected seed in the first axis and second axis directions, calculates a projection function using the status parameter at the present point in time, and updates the status parameter using the calculated intensity error, gradient, and projection function, to reduce the intensity error.

The projection function is a Jacobian of projection function. To update the status parameter for reducing the intensity error using the projection function, a hessian matrix may be calculated using the intensity error, gradient, and projection function, and the status parameter may be updated using the hessian matrix to reduce the intensity is error.

FIG. 6 is a view illustrating a position recognition concept, according to an exemplary embodiment of the present invention.

Referring to FIG. 6, when it is assumed that a portion of the pixels of an edge in an image can be represented by A, B, and C, and the seeds with corresponding coordinates a, b, and c, in the given key frame are projected to the image, it may be understood that there is an intensity difference between the edge in an actual image and the projected seeds, that is, an intensity error in the projected seeds.

In this case, when R and T are updated using Equations 3 to 6, the intensity difference between the edge in the actual image and the projected seeds is reduced, allowing a highly accurate position to be obtained.

According to the exemplary embodiment of the present invention, an accurate position may be recognized by updating parameters R and T, which indicate the rotation and movement of the camera, respectively, so as to reduce the intensity difference between the edge in the actual image and the projected seed, which is referred to as direct tracking.

FIG. 7 is a view illustrating a position recognition process according to an exemplary embodiment of the present invention.

As illustrated in FIG. 7, the position recognizing unit 130 obtains an image at the present point in time in step S710, extracts an edge from the obtained image in step S712, and calculates the magnitude of the extracted edge in step S714.

Here, the position recognizing unit 130 calculates the gradient in each pixel of an edge-containing image in both a first axis and second axis direction, calculates the magnitude of the gradient using the calculated gradients in the first and second axis directions, and sets the calculated magnitude of the gradient as the size of the edge.

Here, the first axis and the second axis may be different axes which are orthogonal to each other in the coordinate system of the edge-containing image plane. That is, the first and second axes may be different axes which are orthogonal to each other in the coordinate system of a stereo image plane. Preferably, the first axis and the second axis may be the x-axis and y-axis of the orthogonal coordinate system formed by the x-axis and the y-axis.

In this case, the position recognizing unit 130 obtains the gradients from each pixel of the image in the x- and y-axis directions, $I_x$ and $I_y$, and calculates a gradient magnitude $I_m$ using the obtained gradients $I_x$ and $I_y$ in the x- and y-axis direction, as represented in Equation 8. Here, the magnitude of the gradient may be considered as the size of the edge.

$$I_m = (I_x^2 + I_y^2)^{1/2} \qquad \text{[Equation 8]}$$

Next, the position recognizing unit 130 projects each seed in the selected key frame in step S720, and calculates the intensity difference in the coordinates of the projected seeds in step S722. For example, the intensity has a value from 0 to 255, and the intensity of the edge is 255. Therefore, the intensity error corresponding to the difference from 255 is calculated.

Next, the position recognizing unit 130 calculates a gradient $\Delta P_i$ in the coordinates of the projected seed, that is, it calculates the gradients $I_x$ and $I_y$ in the x-axis and y-axis directions, respectively, in step S724, as represented in Equation 9.

$$\Delta p_i = \begin{bmatrix} I_x \\ I_y \end{bmatrix} \qquad \text{[Equation 9]}$$

Next, when the rotation and movement R and T of the camera are considered as the status parameter $T_c$, the position recognizing unit 130 calculates the Jacobian of projection function $J_c$ using the status parameter at the present point in time in step S726. The Jacobian of projection function is represented by Equation 10.

$$J_c = \frac{f}{z} \begin{pmatrix} 1 & 0 & \frac{-x}{z} & \frac{-xy}{z} & 1+\frac{x^2}{z} & -y \\ 0 & 1 & \frac{-y}{z} & -1-\frac{y^2}{z} & \frac{xy}{z} & x \end{pmatrix} \qquad \text{[Equation 10]}$$

Next, the position recognizing unit 130 calculates the Hessian matrix, H, using the calculated intensity difference, the gradient, and the Jacobian of projection function in step S728. The hessian matrix, H, is represented by Equation 11.

$$H = J^T W J \qquad \text{[Equation 11]}$$

Here, $J = \Delta p_i^T J_c$, $W = wI$ is a weighting matrix, w is a weighting factor obtained by Huber or Tukey, and I is an image.

Next, the position recognizing unit 130 may update the status parameter using the calculated Hessian matrix.

That is, the position recognizing unit 130 calculates the variation of the status parameter using Equation 6 in step S730. The variation of the status parameter is defined by Equation 12.

$$J^T W J \cdot \nabla T_c = J^T W_e \qquad \text{[Equation 12]}$$

Here, e indicates the intensity difference.

The position recognizing unit 130 checks whether the calculated variation of the status parameter satisfies the predetermined repetition conditions for updating the status parameter in step S732.

Here, the repetition conditions include whether the variation of the status parameter is equal to or greater than the preconfigured threshold value.

That is, when the calculated variation of the status parameter is found to be equal to or greater than the predetermined threshold value, the position recognizing unit 130 updates the status parameter using the calculated variation in step S734. The status parameter to be updated is defined by Equation 13.

$$T_c^{i+1} = \nabla T_c \cdot T_c^i \qquad \text{[Equation 13]}$$

The position recognizing unit 130 may repeat from the process of projecting the seed in the given key frame using the updated status parameter. That is, the position recognizing unit 130 projects the seed in the key frame which is updated by the status parameter and then proceeds to perform the subsequent processes using the changed coordinates of the projected seed.

In contrast, when the calculated variation of the status parameter is found to be within the predetermined threshold, the position recognizing unit 130 may set the current position as the final position in step S736.

FIGS. 8A and 8B are views illustrating a position recognition principle, according to an exemplary embodiment of the present invention.

Referring to FIG. 8A, the edges in the image are illustrated for when the status parameter indicating the rotation and movement of the camera is $T_0$. Among them, the positions of portion of the edges, A, B, and C, are illustrated.

Referring to FIG. 8B, edges in the image are illustrated for when the status parameter indicating the rotation and movement of the camera is $T_1$. Among them, the positions of a portion of the edges, A', B', and C', are illustrated.

That is, when the status parameter $T_0$ in FIG. 8A is assumed to be the status parameter in the current position, the status parameter $T_1$ in FIG. 8B may be estimated to be the status parameter in the position to be updated through the variation, $\nabla T$.

In the present invention, the processes of projecting seeds from a key frame selected based on the status information, calculating the intensity difference between a pixel in an image and the projected seed, updating a status parameter indicating the rotation and movement of the camera to reduce the calculated intensity difference, and estimating the position based on the updated status parameter are repeatedly performed until it is judged that there is virtually no intensity difference, that is, the intensity difference falls within a threshold value.

The obstacle sensing unit 140 receives stereo image input from the wide angle camera 110 and extracts a predetermined number of horizontal lines from the received stereo image. Here, the predetermined number is at least two, and preferably three.

The obstacle sensing unit 140 performs dense stereo matching along the extracted horizontal lines to obtain information on the distance to an obstacle as a result. Here, dense stereo matching is a concept which is distinguished from sparse stereo matching, and is a matching method for calculating exact matching results when matching is performed between stereo images. To this end, various established methods of the related art for adjusting the matching interval or adjusting the search range for the matching may be used.

FIG. 9 is a view illustrating the obstacle sensing process, according to an exemplary embodiment of the present invention.

As illustrated in FIG. 9, the obstacle sensing unit 140 performs highly dense stereo matching based on the received left and right stereo images, as illustrated in FIGS. 9A and 9B, to calculate the depth value. Here, in the image of FIG. 8C, the depth value calculated as described above is represented in grayscale. Further, FIG. 9C illustrates a linear region, L, which is used to sense the obstacle.

In this case, since the depth values for the entire region cannot be calculated by a mobile robot mounted with a small-sized processor, in the exemplary embodiment of the present invention, the depth values are extracted only from a partial region.

The map creating unit 150 is provided with the current position information estimated by the position recognizing unit 130, reconstructs a pose graph based on the provided position information, and updates the previously stored key frame set based on the reconstructed pose graph. A map may be configured by the set of key frames.

The DB 160 stores the key frame set generated in accordance with movement of the mobile robot, that is, the map.

A method for recognizing the position of a mobile robot, according to another exemplary embodiment of the present invention, may include the steps of receiving at least one pair of stereo images obtained using a camera mounted on the mobile robot, extracting an edge from the received stereo images, projecting each seed in a key frame selected based on the extracted edge, updating a status parameter indicating the rotation and movement of the camera using the calculated intensity error of the projected seed, and estimating the position of the mobile robot using the updated results. The method for recognizing the position of a mobile robot may operate in the same way as the apparatus for recognizing the position of a mobile robot described above. Therefore, redundant parts will be omitted or described simply.

The estimation process includes an intensity error calculating step, in which the seeds in the selected key frame are projected onto an image in order to calculate the intensity error between the edge in the image and the projected seeds; a parameter updating step, in which the status parameter indicating the rotation and movement of the camera is updated to reduce the calculated intensity error; and a position estimating step, in which the position of the mobile robot is estimated to be the position where the intensity error is reduced, based on the updated status parameter.

Here, in the parameter update step, gradients are calculated from the coordinates of the projected seeds in the first axis and second axis directions, a projection function is calculated using the status parameter at the present point in time, and the status parameter is updated using the calculated intensity error, gradient, and projection function, in order to reduce the intensity error.

Here, the projection function is a Jacobian of projection function. To update the status parameter for reducing the intensity error using the projection function, a hessian matrix may be calculated using the intensity error, gradient, and projection function, and the status parameter may be updated using the hessian matrix to reduce the intensity error.

FIG. 10 is a view illustrating a method of recognizing the position of a mobile robot, according to an exemplary embodiment of the present invention.

As illustrated in FIG. 10, when an apparatus for recognizing the position of the mobile robot (hereinafter referred to as a position recognizing apparatus), according to an exemplary embodiment of the present invention, receives stereo image input from the wide angle camera in step S910, it extracts a feature point from the input stereo image and continuously traces the extracted feature point by frame in step S920.

Next, the position recognizing apparatus may remove moving objects from the stereo image in step S930.

For example, the position recognizing apparatus compares the current frame and the last n-th frame, and as a result of the comparison, may remove inconsistent features which may be determined to be moving objects.

Next, the position recognizing apparatus performs visual odometry based on the traced feature point to obtain the first type of odometry information as the result in step S940, and obtains the second type of odometry information through internal odometry, based on inertial information, in step S942.

Next, the position recognizing apparatus selects one type of odometry information from between the first and second types of odometry information in step S950, and uses the selected odometry information and pose information to predict the state information in step S960.

In this case, the position recognizing apparatus selects the first odometry information when the first odometry information satisfies the predetermined conditions, and selects the second odometry information when the first odometry information does not satisfy the predetermined conditions.

Here, determining whether the predetermined conditions have been satisfied refers to determining whether the odometry information, for example rate of change of the position information, falls within a predetermined threshold value.

Next, based on the predicted state information, the position recognizing apparatus searches at least one adjacent key frame from among the previously stored key frame set in step S970, and estimates the current position using at least one of the key frames searched in step S980.

That is, the position recognizing apparatus repeatedly performs the processes of projecting the seeds from a selected key frame into the image, calculating the intensity difference between the edge in the image and the pixels corresponding to the coordinates of the projected seeds, updating the status parameter indicating the rotation and movement of the camera to reduce the calculated intensity difference, and estimating the position based on the updated status parameter until the intensity difference falls within a threshold value.

In this case, the position may be estimated more accurately as the number of adjacent key frames increases.

The position recognizing apparatus, according to the exemplary embodiment, may be applied to autonomous cleaning robots or service robots. For example, cleaning robots autonomously move in indoor or outdoor environments. When the cleaning robot moves, it meets various obstacles such as walls, guardrails, desks, or furniture, and the autonomous cleaning robot must determines a moving route along which to move using its own position and the position of obstacles in the cleaning area. According to the exemplary embodiment, the autonomous cleaning robot includes a stereo camera, specifically, a wide angle stereo camera, as an image capturing unit to obtain external images. Through the external environmental information so-acquired, especially the feature points related to edges, the autonomous cleaning robot is able to estimate its own position, determine the driving route, and thus move.

Specifically, in the case of cleaning robots which move autonomously based on simultaneous localization and map-building (SLAM), the exemplary embodiment may be used for the robot to estimate its own position on the constructed lattice map, to estimate the positions of obstacles, to determine a movement route to avoid collision with the obstacles using the estimated position relationships, and to determine an optimal route.

For example, the odometry information may be information obtained from a wheel mounted in the mobile robot or from rotary encoders in a legged joint. The status information such as movement distance of the mobile robot or number of rotations of the wheel may be calculated using the odometry information. Further, the space wherein the mobile robot is currently located may be understood through the status information so that the odometry information may be used to determine the key frame during image processing.

The position recognition method, according to the exemplary embodiment of the present invention, may be implemented as computer readable software, and the software may be executed in a processor mounted in an autonomous cleaning robot.

Even though all components of the exemplary embodiment may be combined as one component or their operations may be combined, the present invention is not limited to the exemplary embodiment. In other words, if it is within the scope or purpose of the present invention, one or more of all of the components may be selectively combined for operation. Further, all of the components may be implemented as one independent hardware, but a part or all of the components may be selectively combined for implementation as a computer program which includes a program module that performs a part or all of the functions combined in one or plural hardwares. Further, such a computer program may be stored on computer readable media such as a USB memory drive, a CD disk, or a flash memory to be read and executed by a computer for implementation of the exemplary embodiment of the present invention. The storage media of the computer program may include media such as magnetic recording media, optical recording media, and carrier wave media.

The exemplary embodiments of the present invention which have been described above are examples and it is obvious to those skilled in the art that various changes or modifications may be made without departing from the spirit and scope of the present invention. Therefore, the exemplary embodiments of the present invention are provided for illustrative purposes only, and are not intended to limit the technical spirit of the present invention. The scope of the technical concept of the present invention is not limited thereto. The protective scope of the present invention should be construed based on the following claims, and all the technical concepts in the equivalent scope thereof should be construed as falling within the scope of the present invention.

What is claimed is:

1. A mobile robot, comprising:
   a camera system;
   at least one processor; and
   a non-transitory computer-readable medium storing instructions that, when executed by the at least one processor, cause the mobile robot to
   capture, by the camera system, image data of an object,
   generate at least one pair of stereo images from the image data;
   extract an edge from the at least one pair of stereo images,
   project a seed in a key frame selected based on the extracted edge,
   update status parameters indicating a rotation and a movement of the camera system to reduce an intensity error in the calculated projected seed, and
   estimate a position of the mobile robot using the updated status parameter.

2. The mobile robot of claim 1, wherein the camera system includes first and second cameras.

3. The mobile robot of claim 1, wherein the non-transitory computer-readable medium further stores instructions that, when executed by the at least one processor, cause the mobile robot to:
   projects project a seed in the selected key frame to calculate an intensity error between an edge in the stereo images and a pixel corresponding to a coordinate of the projected seed;
   update a status parameter indicating the rotation and the movement of the camera system to reduce the calculated intensity error; and
   estimate the position of the mobile robot where the intensity error is reduced based on the updated status parameter.

4. The mobile robot of claim 3, wherein the non-transitory computer-readable medium further stores instructions that, when executed by the at least one processor, cause the mobile robot to calculate gradients in a first axis direction and a second axis direction of a coordinate of the projected seed, calculate a projection function using a current status parameter, and update the current status parameter using the calculated intensity error, the gradient, and the projection function to reduce the intensity error.

5. The mobile robot of claim 4, wherein the projection function is a Jacobian of a projection function and the status parameter is updated to reduce the intensity error using the projection function by calculating a hessian matrix using the intensity error, the gradient, and the projection function.

6. The mobile robot of claim 5, wherein the non-transitory computer-readable medium further stores instructions that, when executed by the at least one processor, cause the mobile robot to calculate a variation of the status parameter to be updated using the hessian matrix, check whether the calculated variation of the status parameter satisfies the predetermined repetition condition to update the status parameter, and select a final position by the status parameter when the repetition condition is not satisfied.

7. The mobile robot of claim 6, wherein the non-transitory computer-readable medium further stores instructions that, when executed by the at least one processor, cause the mobile robot to, when the repetition condition is satisfied, update the status parameter using the calculated variation.

8. The mobile robot of claim 6, wherein the repetition condition includes whether the variation of the status parameter is equal to or greater than the predetermined threshold value.

9. The mobile robot of claim 1, wherein the non-transitory computer-readable medium further stores instructions that, when executed by the at least one processor, cause the mobile robot to predict a movement point using odometry information calculated based on the edge and estimates the position of the mobile robot using the predicted movement point and a key frame adjacent to the movement point.

10. The mobile robot of claim 1, wherein the non-transitory computer-readable medium further stores instructions that, when executed by the at least one processor, cause the mobile robot to predict a movement point using one of first odometry information calculated based on the edge and second odometry information calculated based on inertia information, and estimate the position of the mobile robot using the predicted movement point and a key frame that is adjacent to the movement point.

11. The mobile robot of claim 10, wherein the non-transitory computer-readable medium further stores instructions that, when executed by the at least one processor, cause the mobile robot to predict the movement point using the first odometry information when the first odometry information satisfies the predetermined condition and predict the movement point using the second odometry information when the first odometry information does not satisfy the predetermined condition.

12. The mobile robot of claim 10, wherein the non-transitory computer-readable medium further stores instructions that, when executed by the at least one processor, cause the mobile robot to search for at least one adjacent key frame among a previously stored key frame set based on the predicted movement point and estimate the position of the mobile robot using the at least one adjacent key frame.

13. The mobile robot of claim 1, wherein the non-transitory computer-readable medium further stores instructions that, when executed by the at least one processor, cause the mobile robot to extract the edge by either:

calculating a gradient in a first axis direction and a second axis direction in each pixel of the at least one pair of stereo images and extracting the edge based on the gradient ; or performing a smoothing process on the at least one pair of stereo images to obtaining a smoothing image and comparing the smoothing image and an original stereo image.

14. A non-transitory computer-readable medium storing instructions that, when executed by a computing apparatus cause the computing apparatus to:

receive at least one pair of stereo images obtained using a camera of a mobile robot;

extract an edge from the at least one pair of stereo images to project a seed in a key frame selected based on the extracted edge;

update status parameters indicating a rotation and a movement of the camera to reduce an intensity error in the projected seed; and estimate the position of the mobile robot using the update result.

15. The non-transitory computer-readable medium of claim 14, wherein the estimating includes:

projecting a seed in the selected key frame onto at least one pair of stereo images to calculate an intensity error between an edge and the pixel corresponding to a coordinate of the projected seed as a projection result;

updating a status parameter indicating the rotation and the movement of the camera to reduce the calculated intensity error; and estimating a position of the mobile robot as a position where the intensity error is reduced based on the updated status parameter.

16. The non-transitory computer-readable medium of claim 15, wherein the updating incudes, calculating a gradient in the first axis direction and the second axis direction in a coordinate of the projected seed, calculating a projection function using the status parameter, and updating the status parameter using the calculated intensity error, the gradient, and the projection function to reduce the intensity error.

17. The non-transitory computer-readable medium of claim 16, wherein the projection function is a Jacobian of the projection function and the status parameter is updated to reduce the intensity error using the projection function by calculating a hessian matrix using the intensity error, the gradient, and the projection function, using the hessian matrix.

18. The non-transitory computer-readable medium of claim 17, wherein in the estimating, a variation of the status parameter to be updated is calculated using the hessian matrix, it is checked whether the calculated variation of the status parameter satisfies the predetermined repetition condition to update the status parameter, and the final position is selected by the status parameter at the present time when the repetition condition is not satisfied as the checking result.

19. The non-transitory computer-readable medium of claim 18, wherein in the estimating, when the repetition condition is satisfied as the checking result, the status parameter is updated using the calculated variation.

20. The non-transitory computer-readable medium of claim 18, wherein the repetition condition includes whether the variation of the status parameter is equal to or larger than the predetermined threshold value.

* * * * *